United States Patent [19]
Frett

[11] Patent Number: 5,305,464
[45] Date of Patent: Apr. 19, 1994

[54] METHOD AND APPARATUS FOR DETERMINING CHANNEL TO WHICH A RECEIVER IS TUNED

[75] Inventor: Kenneth J. Frett, Crystal Beach, Fla.

[73] Assignee: A. C. Nielsen Company, Northbrook, Ill.

[21] Appl. No.: 862,985

[22] Filed: Apr. 6, 1992

[51] Int. Cl.⁵ .................. H04B 17/02; H04N 7/10; G09G 3/36
[52] U.S. Cl. .................. 455/2; 455/154.1; 345/5; 345/102; 345/207; 348/1
[58] Field of Search .................. 340/716, 783, 784 G, 340/767; 455/2, 154.1, 158.1, 158.2, 158.3, 159.1, 159.2, 186.1; 358/192.1, 84; 359/39, 72, 48; 345/5, 102, 207

[56] References Cited

U.S. PATENT DOCUMENTS

| | | |
|---|---|---|
| 3,973,206 | 8/1976 | Haselwood et al. |
| 4,167,005 | 9/1979 | Beauviala ................ 359/48 |
| 4,289,383 | 9/1981 | Schwarzschild ............ 359/48 |
| 4,330,813 | 5/1982 | Deutsch .................. 359/48 |
| 4,385,399 | 5/1983 | Ogita .................. 455/158.3 |
| 4,425,578 | 1/1984 | Haselwood et al. |
| 4,723,302 | 2/1988 | Fulmer et al. ............ 455/2 |
| 4,760,389 | 7/1988 | Aoki et al. .............. 340/784 G |
| 4,764,808 | 8/1988 | Solar .................. 358/84 |
| 4,876,736 | 10/1989 | Kiewit .................. 455/2 |
| 5,032,828 | 7/1991 | Hirose et al. ............ 340/784 G |
| 5,153,760 | 10/1992 | Ahmed .................. 359/72 |
| 5,168,382 | 12/1992 | Tsujikawa ............... 359/72 |

Primary Examiner—Reinhard J. Eisenzopf
Assistant Examiner—Lisa Charouel
Attorney, Agent, or Firm—Marshall, O'Toole, Gerstein, Murray & Borun

[57] ABSTRACT

A method and apparatus for identifying the channel to which a receiver is tuned includes a controller having a microprocessor, a ROM for storage of programs, a RAM for storage of data and a data storage and communication device; a controlled panel mounted adjacent a light emitting diode (LED) display on the receiver that displays the channel to which the receiver is tuned; and a light detection device mounted in association with the panel. The panel normally is maintained transparent so that the LED display may be readily seen through the panel. In order to determine the number being displayed on the LED display, selected portions of the panel are sequentially rendered transparent while the remaining portions of the panel are maintained opaque. The controller determines which selected portions of the panel have light being transmitted therethrough from the LED display. Based on these determinations, the channel being displayed on the LED display can be determined so that the channel to which the receiver is tuned can be identified and information relating thereto can be stored in the data storage and communication device for later evaluation. In one embodiment of the channel identifier apparatus, the light detecting device includes a light sensor mounted in front of and adjacent the panel. In another embodiment of the channel identifier apparatus, the light detecting device includes a photo-resistive wire embedded in or mounted on the panel.

23 Claims, 3 Drawing Sheets

METHOD AND APPARATUS FOR DETERMINING CHANNEL TO WHICH A RECEIVER IS TUNED

BACKGROUND OF THE INVENTION

1. Field of the Invention

This invention relates generally to a method and apparatus for determining the channel to which a receiver is tuned, and more particularly, to a new and improved method and apparatus for identifying the channel number being displayed by a light emitting display on the receiver.

2. Description of the Prior Art

Various arrangements have been employed to determine the channel to which a television receiver is tuned. A disadvantage of many known monitoring arrangements is that an internal connection to the television receiver is required. For example, Haselwood et al. U.S. Pat. No. 3,973,206, issued on Aug. 3, 1976, discloses a method of determining the channel to which a receiver is tuned by monitoring the varactor diode tuning voltage. However, this type of monitoring requires that internal connections be made inside of the television receiver.

Another method for determining channel tuning is disclosed in Haselwood et al. U.S. Pat. No. 4,425,578, issued on Jan. 10, 1984. In connection with the method disclosed in that patent, a signal injection source and a detector/receiver are arranged so as to detect the combined signal from the injection signal source and a video carrier to which the video receiver is tuned. A significant drawback of signal injection monitoring arrangements of this type is the potential interference with the functional operation of the video receiver being monitored.

U.S. Pat. No. 4,723,302, issued on Feb. 2, 1988, discloses another method for determining channel tuning. This method utilizes a local oscillator frequency measurement of the monitored receiver. While this method is generally effective, the disclosed method and apparatus requires that a probe be positioned at a selected location in the monitored receiver. Consequently, physical access to the receiver is required.

Access to the tuning mechanism of a television receiver is becoming increasingly difficult. This is particularly the case with the advent of cable and pay television systems that utilize various converters and decoders, many of which are difficult to access. As a result, various other monitoring systems have been developed.

For example, Solar U.S. Pat. No. 4,764,808, issued on Aug. 16, 1988, discloses a method of determining the channel to which a receiver is tuned by detecting a horizontal sweep signal of the monitored receiver. The frequency of the detected sweep signal is compared to stored characteristic frequency values in order to determine the channel to which the receiver is tuned. Another example of a method used in determining the channel to which a receiver is tuned is disclosed in Kiewit U.S. Pat. No. 4,876,736, issued on Oct. 24, 1989. This method can be utilized when a remote control is being used to select the channel to which the receiver is tuned. The signal transmitted by the remote control is intercepted by a first receiver so that the desired channel can be stored. The first receiver than transmits an activating signal to the receiver.

These types of methods for determining the channel to which a receiver is tuned eliminates the necessity of actually gaining access to the receiver being monitored. However, the methods used in determining the channel to which the receiver is tuned are quite complex and/or only are usable if a remote control is utilized to change the channel to which the receiver is tuned.

SUMMARY OF THE INVENTION

Accordingly, it is an object of the present invention to provide a new and improved non-intrusive method and apparatus for determining the channel to which a receiver is tuned.

It is another object of the present invention to provide a new and improved method and apparatus for determining the channel to which a receiver is tuned that is relatively simple and does not require access to the internal portions of the receiver.

It is yet another object of the present invention to provide a new and improved method and apparatus for determining the channel to which a receiver is tuned by detecting the channel number being displayed by the receiver.

It is still another object of the present invention to provide a new and improved method and apparatus for determining the channel to which a receiver is tuned by determining through what portions of a panel mounted adjacent a light emitting diode (LED) display light from the LED display is being transmitted.

In brief, the objects and advantages of the present invention are achieved by a method and apparatus for identifying the channel to which a receiver is tuned. The receiver may be a television tuner, an external cable tuner, a video cassette recorder (VCR) or any other receiver that utilizes a light emitting diode (LED) display to display the number to which the receiver is tuned. The channel identifier apparatus for accomplishing the identification of the channel includes a controller having a microprocessor, a ROM for storage of programs, a RAM for storage of data and a data storage and communication device; a controlled panel mounted adjacent the LED display of the television receiver; and a light detection device mounted in association with the panel. The controlled panel normally is maintained transparent so that the LED display may be readily seen through the panel. In order to determine the number being displayed on the LED display, a selected, controlled portion of the panel is maintained transparent while the remainder of the panel is rendered opaque. As a result, the light detection device can be used to determine whether light being emitted from the LED display is being transmitted through that selected, controlled area of the panel. By sequentially rendering selected portions of the panel transparent while rendering the remaining portions opaque, the controller can make a determination as to which selected portions of the panel have light from the LED display transmitted therethrough. Thereafter, the channel being displayed on the LED display can be determined by comparing the pattern of selected panel portions through which light has been transmitted to patterns stored in the controller. once the channel to which the receiver is tuned is identified and information relating thereto can be stored in the data storage and communication device for later evaluation.

In one embodiment of the channel identifier apparatus, the light detecting device includes a light sensor mounted in front of and adjacent the panel that detects light being transmitted through the transparent portions of the panel. In another embodiment of the channel identifier apparatus, the light detecting device includes a photo-resistive wire embedded in or mounted on the panel. When such a light detecting device is used, light being transmitted through the transparent portions of the panel is detected by the change in the resistance of the photo-resistive wire.

BRIEF DESCRIPTION OF THE DRAWING

The present invention together with the above and other objects and advantages may best be understood from the following detailed description of the embodiment of the invention illustrated in the drawing, wherein.

DETAILED DESCRIPTION OF THE PREFERRED EMBODIMENT

Figure 1:
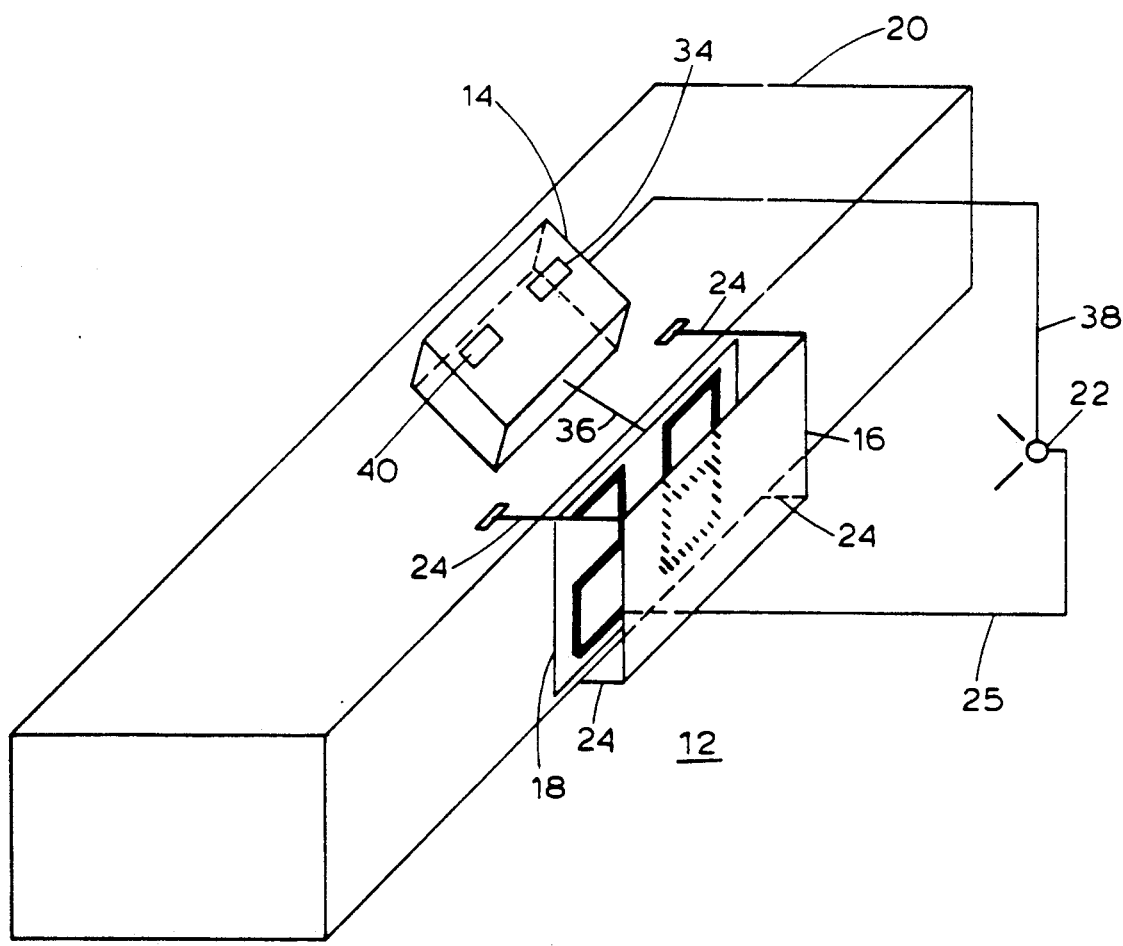
FIG. 1 is a perspective view of a portion of a television receiver device that has a light emitting diode (LED) display for providing a visual display of the channel to which the receiver is tuned and of a perspective view of a channel identifier apparatus associated with the receiver and embodying the present invention.

Referring now more specifically to FIG. 1 of the drawings, therein is disclosed a channel identifier apparatus which embodies the present invention and which is generally designated by the reference numeral 12. The channel identifier apparatus 12 includes a controller 14, a liquid crystal display (LCD) panel 16 mounted adjacent a light emitting diode (LED) display 18 of a receiver 20 and a light sensor 22 mounted adjacent the panel 16. The receiver 20 that is diagrammatically shown in FIG. 1 may be a television tuner, an external cable tuner, a video cassette recorder (VCR) or any other receiver that utilizes a light emitting diode (LED) display to display the number to which the receiver is tuned. The panel 16 normally is maintained transparent so that the LED display 18 may be readily seen through the panel 16. In order to determine the number being displayed on the LED display 18, the panel 16 is subdivided into panel portions. The panel portions are sequentially maintained transparent while the remainder of the panel 16 is rendered opaque. As a result, the light sensor 22 can be used to determine whether light being emitted from the LED display 18 is being transmitted through the panel portions that have be rendered transparent. After all of the panel portions of the panel 16 have been tested, the controller 14 can be used to determine what numbers are being displayed on the LED display 18 so that the channel to which the receiver 20 is tuned can be identified and information relating thereto can be stored for later evaluation.

As previously indicated, the receiver 20 may be of any type having a LED type display, such as the LED display 18, that identifies the channel to which the receiver 20 is tuned. In the illustration shown in FIG. 1, the LED display 18 is shown displaying two numbers. One of the numbers is the number "2" and the other number is the number "8". Hence, the receiver 20 is tuned to channel "28". As can be appreciated from the illustration of the number "8" in FIG. 1, each of the numbers in the LED display 18 consists of seven straight line segments. For example, all seven segments of the display are illuminated when the number "8" is illuminated on the LED display 18. On the other hand, the number "2" is produced by the illumination of just five of the seven segments. This type of seven-segment display for the numbers in the LED display 18 is a standard LED number display which emits red, green or other color light.

Figure 4:
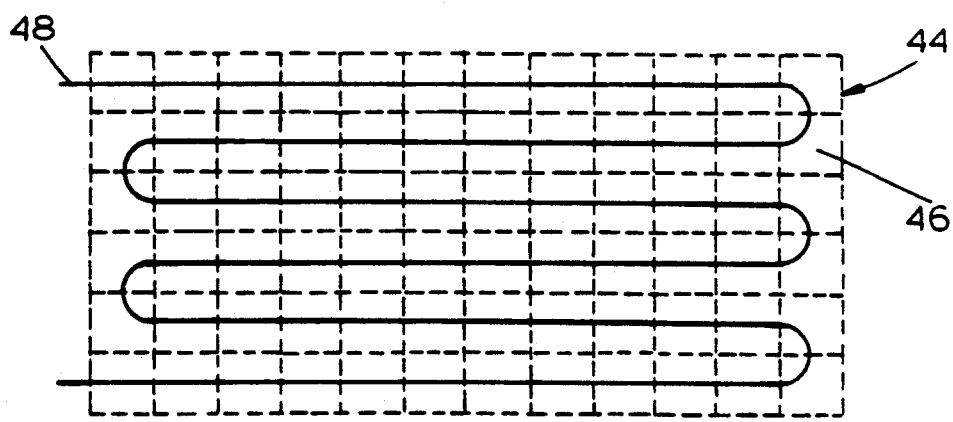
FIG. 4 is a diagrammatic view of an alternate embodiment of a panel that can used in a channel identifier apparatus embodying the present invention.

In order to detect the number or numbers being displayed on the LED display 18, the panel 16 is mounted by appropriate mounting brackets 24 to the receiver 20 such that the panel 16 is mounted in front of and adjacent to the LED display 18. Any appropriate panel that can be controlled so that selected portions of the panel can be rendered transparent and/or opaque can be used for the panel 16. As will be discussed hereinafter in connection with FIGS. 2 and 4, one such type of panel that is particularly suitable for use as the panel 16 is a liquid crystal display (LCD). In its normal mode of operation, the LCD panel 16 is maintained entirely transparent so that the numerals on the LED display 18 can be readily seen through the panel 16. The LCD panel 16 can be selectively rendered opaque except for a specified or selected, controlled portion. When the panel 16 is so rendered opaque except for that selected portion, a determination can be made whether any light from the LED display 18 is being transmitted through that portion of the panel 16.

The light sensor 22 may be any suitable light sensor that can detect the type of light being emitted by a LED display such as the LED display 18. For instance, the light sensor 22 may be of the type that detects red or green light because those are two of the more commonly used colors emitted by a LED display. The light sensor 22 is mounted adjacent to and in front of the panel 16 by an appropriate mounting bracket 25 so that the light sensor 22 is adapted to detect light that is being transmitted from the numerals in the LED display 18 through the panel 16. When only a selected, controlled portion of the panel 16 is rendered transparent, the light sensor 22 will detect whatever light might be transmitted through that selected, controlled portion of the panel 16. The light sensor 22 may actually be positioned directly in front of the panel 16 as shown in FIG. 1 or may be positioned offset toward an edge of the panel 16 so as not to interfere with the viewing of the LED display 18. The positioning of the light sensor 22 vis-a-vis the panel 16 is dependent at least in part on having the light sensor 22 positioned so that it can detect a sufficient amount of light being emitted from the LED display 18 to enable a determination to be made as to whether light from the LED display 18 is being transmitted through the various portions of the panel 16.

Figure 2:
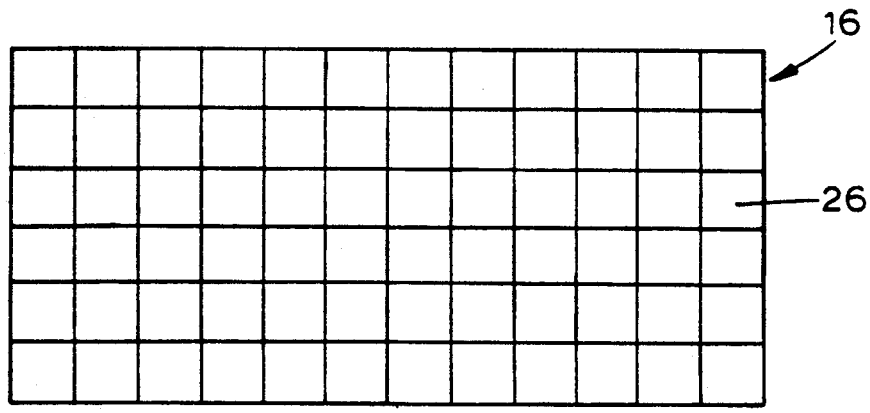
FIG. 2 is a diagrammatic view of a panel that can used in the channel identifier apparatus illustrated in FIG. 1 of the drawings.

As shown in FIG. 2 of the drawings, the panel 16 can be considered as subdivided into an array of rectangular portions or areas; these areas are generally designated in FIG. 2 as areas 26. Each of the areas 26 can be composed of a group of pixels of the LCD panel 16 that are individually controllable so as to be rendered either transparent or opaque. While the particular size of each of the areas 26 on the panel 16 possibly needs to be adjusted to the size of the numbers being displayed by the LED display 18, it is anticipated that each of the areas 26 would have a length that is less than one-quarter of the length of one of the segments of the seven segments forming the numbers in the LED display 18.

Figure 3:
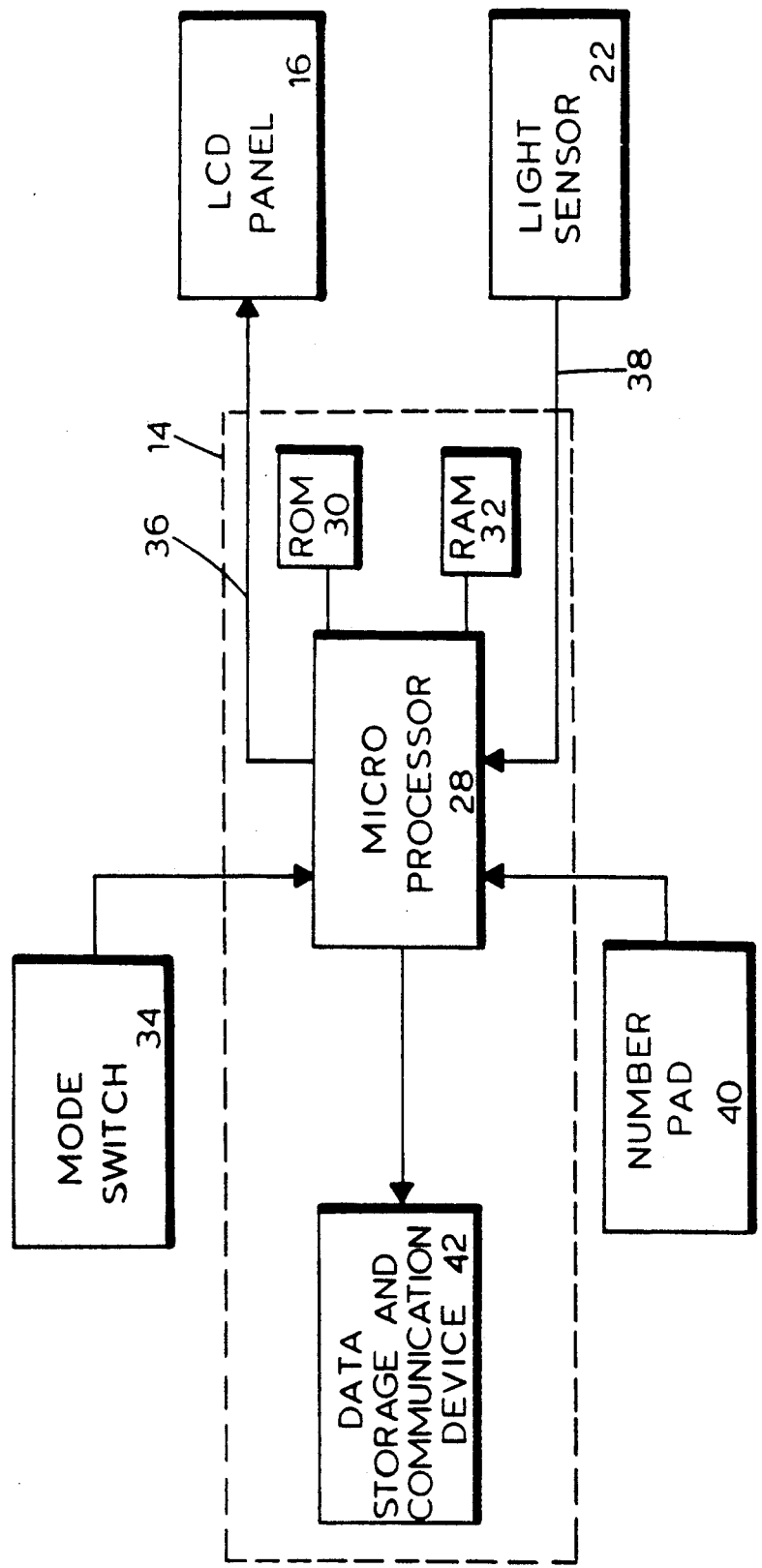
FIG. 3 is a block diagram of the electrical components of the channel identifier apparatus illustrated in FIG. 1 of the drawings.

As previously indicated and as is illustrated by the block diagram in FIG. 3 of the drawing, the controller 14 contains the components for controlling the operation of the panel 16 and receiving and storing data from the light sensor 22. These components include a microprocessor 28 which may be any appropriate microprocessor device such as a RCA microprocessor type 1805 or a Motorola Inc. microprocessor device 68HC11. The microprocessor 28 has associated therewith a ROM 30 for the storage of programs and a RAM 32 for storing data. A mode switch 34 associated with the microprocessor 28 is mounted on the controller 14 and is used to selectively place the microprocessor 28 in an operating mode or in a learning mode.

The microprocessor 28 controls the LCD panel 16 via a line 36. When the microprocessor 28 is in its operating mode, the microprocessor 28 normally maintains all of the areas 26 of the LCD panel 16 transparent so that the numerals in the LED display 18 may be readily discerned through the LCD panel 16. In order to evaluate the light being emitted from the LED display 18, the microprocessor 28 turns the entire LCD panel 16 opaque for a predetermined short period of time and via a line 38 obtains from the light sensor 22 an ambient light reference reading. Thereafter, the microprocessor 28 selects one of the areas 26 of the LCD panel 16 to be transparent while rendering the remaining areas 26 opaque for a predetermined short period of time. A determination then is made via the light sensor 22 whether light from the LED display 18 is being transmitted through the selected transparent area 26. After that determination is made, the entire LCD panel 16 is rendered transparent for a predetermined period of time in order that the numerals on the LED display 18 may be viewed.

The microprocessor 28 sequentially renders each of the areas 26 transparent while rendering the remaining areas 26 opaque for a predetermined short period of time. In each such instance, the microprocessor 28 makes a determination whether light from the LED display 18 is being transmitted through that selected transparent area 26. Between each such determination, the microprocessor 28 confirms that the ambient light reference reading is correct by rendering the entire LCD panel 16 opaque for a short period of time before selecting one of the areas 26 to be transparent. Once all of the areas 26 on the LCD panel 16 have been tested, the microprocessor 28 can determine what number or numbers are being displayed on the LED display 18 by comparing the results of the testing of the areas 26 to characteristic patterns that have been developed for each set of numbers that can be displayed by the LED display 18.

In order for the microprocessor 28 to be able to determine based on the testing of the areas 26 what numbers are being displayed on the LED display 18, the microprocessor 28 has to be able to ascertain through what areas 26 light will be transmitted when a particular number or numbers are being displayed on the LED display 18. This can be accomplished by setting the microprocessor mode switch 34 to its learning mode. With the microprocessor 28 in its learning mode, the microprocessor 28 will store in the RAM 32 the areas 26 through which light is transmitted when the receiver 20 is set to a particular channel.

More specifically, the receiver 20 is sequentially set to each of the channels to which the receiver 20 may be tuned. As each of the channel numbers is displayed sequentially on the LED display 18, the channel number also is entered on a number pad 40 that is mounted on the controller 14. As a result, the microprocessor 28 also is set to that channel number. The above discussed sequence of rendering each of the areas 26 on the LCD panel 16 transparent while maintaining the remaining areas 26 opaque is initiated. After all of the areas 26 have been so tested, the microprocessor 28 will store in the RAM 32 from which of the areas 26 light was detected for the particular channel being displayed on the LED display 18. After all of the channels for the receiver 20 have been so tested, the microprocessor 28 will have stored in the RAM 32 a table of characteristic patterns of which of the areas 26 will have light transmitted through that area 26 for each of the channels to which the receiver 20 can be tuned. The table stored in the RAM 32 is used by the microprocessor 28 to determine which channel is being displayed on the LED display 18 whenever the microprocessor 28 is switched into its operating mode by the mode switch 34.

When the microprocessor 28 is in its operating mode, the time, date and the channel detected by the microprocessor 28 is recorded in a data storage and communication device 42. The data storage and communication device 42 not only enables such data to be stored, but also enables such data to be subsequently retrieved by appropriate communication methods. For example, the data recorded in the data storage and communication device 42 may be supplied to a central computer (not shown) via telephone lines coupled between the data storage and communication device 42 and the central computer. While the microprocessor 28 may be programmed to continuously detect the channel being displayed on the LED display 18 and record the channel so detected in the data storage and communication device 42, alternatively the microprocessor 28 can be programmed such that the recording of data only occurs when the channel being displayed is changed.

The channel identifier 12 needs to be normally operated such that the viewing of the channel on the LED display 18 is not adversely affected. As a result, the period of time during which the entire panel 16 or any portion thereof is rendered opaque must be of an extremely short duration. In fact, the time should be subliminal or so brief that a person who might be viewing the channel being displayed on the LED display 18 will not be aware that any portions of the panel 16 have been rendered opaque.

As discussed above, the channel identifier 12 utilizes the light sensor 22 to determine whether light is being emitted from a particular number on the LED display 18 through the areas 26 on the panel 16. When the light sensor 22 is so used, the positioning of the light sensor 22 possibly can be a problem because the light sensor 22 needs to be positioned so as to detect the light being transmitted through the panel 16, but needs to be positioned so as not to obstruct the view of the numbers being displayed on the LED display 18. If the position of the light sensor 22 becomes a problem, an alternate panel 44 illustrated in FIG. 4 of the drawings may be used. The panel 44 can be positioned in front of the LED display 18 in the same matter as the panel 16 is positioned by the mounting brackets 24. The panel 44 also can be a liquid crystal display that is subdividable into areas 46 similar to the areas 26 in to which the panel 16 is subdividable. The panel 44 in addition includes a thin photo-resistive wire 48 that is embedded in the panel 44 or on the surface of the panel 44 remote from the LED display 16. The same sequence used by the channel identifier apparatus 12 to identify the areas 26 of the panel 16 through which light is being transmitted from the LED display 16 can be used with the panel 44. However, the light being transmitted is detected by the photo-resisitive wire 48 instead of the light sensor 22.

More specifically, the microprocessor 28 sequentially renders each of the areas 46 transparent while rendering the remaining areas 46 opaque for a predetermined short period of time. In each such instance, the microprocessor 28 makes a determination whether light from the LED display 18 is being transmitted through that selected transparent area 46. This is accomplished by comparing the resistance of the photo-resistive wire 48 when the entire panel 44 is rendered opaque to the resistance of the photo-resistive wire 48 when the particular area 46 is maintained transparent while the remaining areas 46 are rendered opaque. Once all of the areas 46 on the LCD panel 44 have been tested, the microprocessor 28 can determine what number or numbers are being displayed on the LED display 18 by comparing the results of the testing of all of the areas 46 to characteristic patterns that have been developed during the learning mode of the channel identifier apparatus 12 for each set of numbers that can be displayed by the LED display 18.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An apparatus for facilitating identification of a channel to which a receiver is tuned, said receiver having a light emitting display means for displaying a channel symbol related to the channel to which the receiver is tuned, said apparatus comprising:
   panel means mounted adjacent said light emitting display means for selectably transmitting light from portions of said channel symbol displayed by said light emitting display means, said panel means being controllable such that selected panel portions of said panel means are rendered transparent or opaque;
   light detecting means for detecting the light being emitted by said light emitting display means and being transmitted through said selected panel portions of said panel means that are rendered transparent; and,
   control means associated with said panel means and coupled to the light detecting means for controlling said panel means to render said selected panel portions of said panel means transparent or opaque and responsive to the light detecting means for determining the channel symbol being displayed by the light emitting display means.

2. The apparatus as set forth in claim 1, wherein said panel means is maintained entirely transparent except when said channel symbol is to be identified.

3. The apparatus as set forth in claim 2, wherein said control means renders said panel means entirely opaque for a predetermined short period of time so as to determine an ambient light reference reading from said light detecting means.

4. The apparatus as set forth in claim 1, wherein said control means sequentially renders different selected panel portions of said panel means transparent while maintaining opaque the remaining portions of said panel means.

5. The apparatus as set forth in claim 1, wherein said light emitting display means includes a light emitting diode display containing a seven segment display for each number being displayed.

6. The apparatus as set forth in claim 5, wherein said selected panel portions of said panel means form an array of areas on said panel means, each of said areas of said array having a length that is less than one-quarter of the length of a segment of said seven segment display.

7. The apparatus as set forth in clam 1, wherein said light detecting means includes a light sensor means mounted adjacent said panel means so as to detect the light being transmitted through said selected panel portions that are rendered transparent.

8. The apparatus as set forth in claim 1, wherein said panel means is a liquid crystal display having said selected panel portions, wherein each of said selected panel portions may be maintained transparent or rendered opaque.

9. The apparatus as set forth in claim 1, wherein said light detecting means includes a photo-resistive wire mounted on said panel means.

10. The apparatus as set forth in claim 1, wherein said control means includes a microprocessor for controlling each of said selected panel portions of said panel means and for analyzing the light detected by said light detecting means to determine what channel symbol is being displayed on said light emitting display means.

11. The apparatus as set forth in claim 1, including a number inputting means associated with said control means for manually inputting a channel number related to the channel symbol displayed by said light emitting display means and wherein said control means has a learning mode whereby said control means determines and stores a pattern of the panel portions through which the light from said light emitting display means is transmitted for each channel symbol displayed on said light emitting display means.

12. An apparatus for facilitating identification of a channel to which a receiver is tuned, said receiver having a light emitting display means for displaying a channel symbol related to the channel to which the receiver is tuned, said apparatus comprising:
   panel means mounted adjacent said light emitting display means for selectably transmitting light from portions of said channel symbol displayed by said light emitting means, said panel means being controllable such that panel portions of said panel means are rendered opaque;
   light detecting means for detecting the light being emitted by said light emitting display means and being transmitted through said transparent panel portions; and,
   control means associated with said panel means and coupled to the light detecting means for controlling said panel means to sequentially render each of said panel portions of said panel means transparent while maintaining the remaining panel portions opaque and responsive to the light detecting means for determining the channel symbol being displayed by the light emitting display means.

13. The apparatus as set forth in claim 12, wherein said light detecting means includes a light sensor means mounted adjacent said panel means to as to detect the light being transmitted through said panel portions that are rendered transparent.

14. The apparatus as set forth in claim 12, wherein said panel means is a liquid crystal display having said panel portions, wherein each of said panel portions may be maintained transparent or rendered opaque.

15. The apparatus as set forth in claim 12, wherein said light detecting means includes a photo-sensitive wire mounted on said panel means.

16. The apparatus as set forth in claim 12, wherein said control means includes a microprocessor for controlling the transparency of each of said panel portions of said panel means and for analyzing the light detected by said light detecting means to determine what channel symbol is being displayed on said light emitting display means.

17. The apparatus as set forth in claim 16, wherein said control means further includes a data storage and communication means for storing data as to the channel symbols.

18. A method of identifying a channel to which a receiver is tuned, said receiver having a light emitting display for displaying a channel symbol related to the channel to which the receiver is tuned, said method comprising:

sequentially rendering panel portions of a panel mounted adjacent said light emitting display transparent while maintaining the remaining panel portions of said panel opaque;

detecting, by means of a light detector associated with said panel, light emitted by said light emitting display and transmitted through said transparent panel portions of said panel; and determining, based on the light being detected from each of the portions sequentially rendered transparent, the channel symbol displayed on the light emitting display.

19. The method of identifying a channel to which the receiver is tuned set forth in claim 18 including the step of rendering said panel mounted adjacent said light emitting display entirely opaque prior to said step of sequentially rendering said panel portions transparent in order to determine a light reference reading by said light detector.

20. A method of identifying the channel symbol to which the receiver is tuned as set forth in claim 18, wherein said light detector includes a light sensor mounted adjacent said panel so as to detect the light being transmitted through said panel portions that are rendered transparent.

21. The method of identifying a channel to which the receiver is tuned set forth in claim 18, wherein said panel is a liquid crystal display having said panel portions, wherein each of said panel portions may be maintained transparent or rendered opaque.

22. The method of identifying the channel symbol to which the receiver is tuned as set forth in claim 18, wherein said light detector includes a photoresistive wire mounted on said panel.

23. A method of identifying the channel symbol to which the receiver is tuned set forth in claim 18, wherein said sequentially rendering and said determining said steps are accomplished by a microprocessor that controls the transparency of each of said panel portions of said panel and analyzes the light detected by said light detector to determine what channel symbol is being displayed on said light emitting display.

* * * * *